(No Model.)
R. A. McLEOD.
FERTILIZER ATTACHMENT FOR SEED DRILLS.
No. 374,367. Patented Dec. 6, 1887.
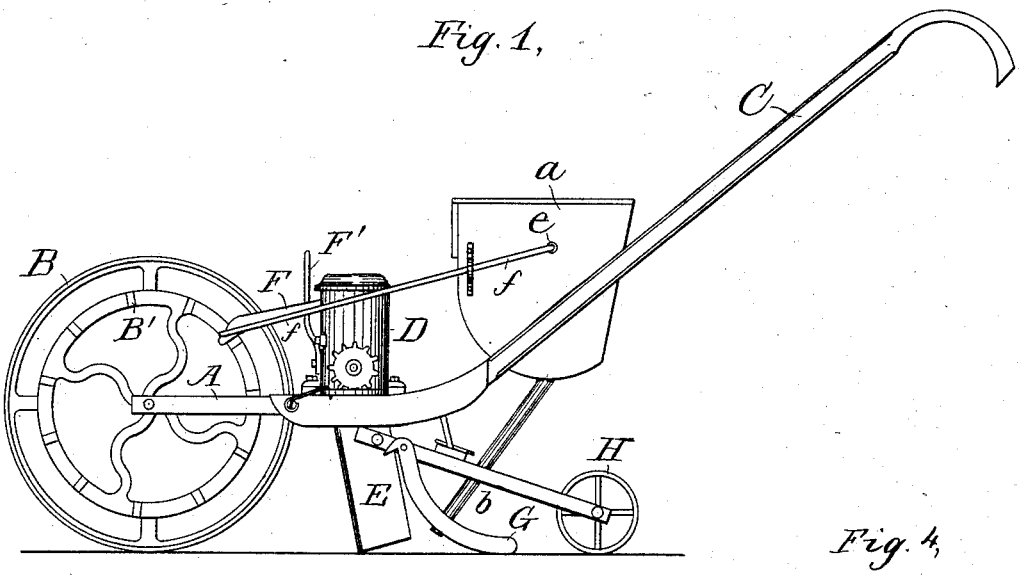
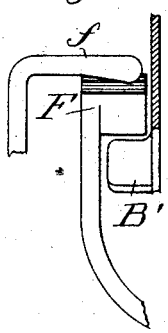
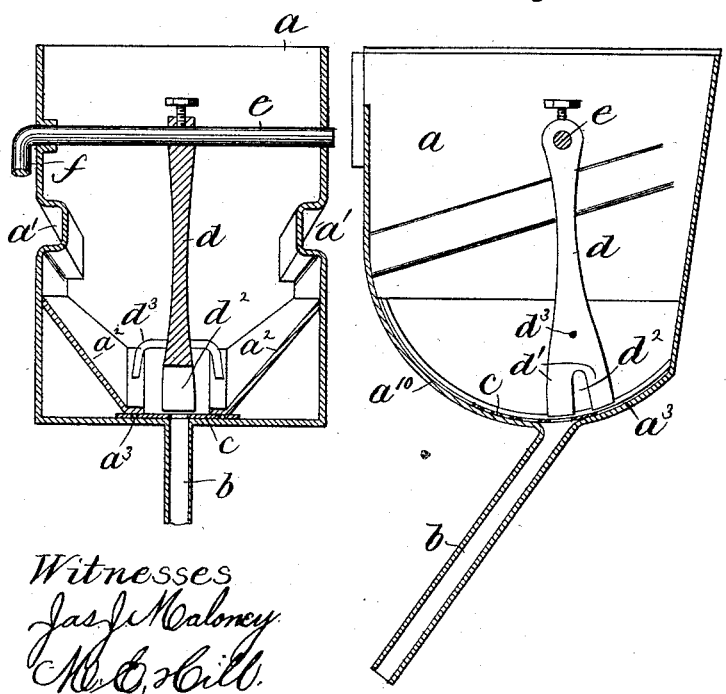
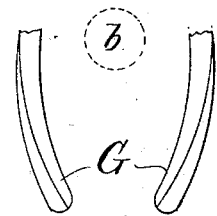
Witnesses
Jas J Maloney
M. C. Hill
Inventor,
R. A. McLeod
by Jos. P. Livermore
Att'y.

UNITED STATES PATENT OFFICE.

RODERICK A. McLEOD, OF WEST MACEDON, NEW YORK, ASSIGNOR TO THOMAS B. EVERETT, OF BOSTON, MASSACHUSETTS.

FERTILIZER ATTACHMENT FOR SEED-DRILLS.

SPECIFICATION forming part of Letters Patent No. 374,367, dated December 6, 1887.

Application filed September 9, 1887. Serial No. 249,230. (No model.)

*To all whom it may concern:*

Be it known that I, RODERICK A. MCLEOD, of West Macedon, county of Wayne, State of New York, have invented an Improvement in Fertilizer Attachments for Seed-Drills, of which the following description, in connection with the accompanying drawings, is a specification, like letters on the drawings representing like parts.

The object of my invention is to provide an attachment for seed-drills by which phosphates or other desired fertilizers may be distributed uniformly in the furrow with the seeds.

The said apparatus consists, essentially, of a removable reservoir to contain the fertilizer, adapted to be supported on the drill or seeding-machine at the rear of the seed-receptacle, and having a spout or conductor leading down to deposit the fertilizer in the furrow in which the seeds are deposited by the machine. The said reservoir contains an agitator and actuating mechanism by which it is operated in conjunction with the seed-delivering device, and by which the delivery-passage from the fertilizer-reservoir is closed when the seed mechanism is not in operation.

The fertilizer attachment forming the subject of this invention is shown as applied to a seed-drill of substantially the kind shown in Letters Patent No. 139,074, dated May 20, 1873; but it is obvious that by various modifications it can be applied to other seed-drills without departing from the main features of the invention, the object of which is to provide a fertilizer attachment that can be applied to seed-drills without change in their construction.

Figure 1 is a side elevation of a seed-drill such as now commonly made, provided with a fertilizer attachment embodying this invention; Fig. 2, a longitudinal section of the fertilizer attachment removed from the drill; Fig. 3, a transverse vertical section thereof; and Figs. 4 and 5, details, to be referred to.

The fertilizer attachment forming the subject of this invention is shown as applied to a seed-drill of usual construction, comprising a frame, A, supporting an actuating-wheel, B, and pair of handles C, separated at their upper ends and converged toward the frame A, to which they are attached. The said machine also comprises a seed-reservoir, D, and conductor or drill, E, which opens the furrow and guides the seeds from the receptacle D into the same. The seed-receptacle contains an agitator operated by an arm, F, and projections B' on the wheel B in the well-known manner. At the rear of the seed-conductor E is a furrow-coverer, G, substantially like that shown in the patent referred to, and a roller, H, that bears on the top of the closed furrow.

The fertilizer attachment which forms the subject of this invention consists of a reservoir or receptacle, $a$, of suitable size and shape to contain the fertilizer, and shown in this instance as provided with grooves or shoulders $a'$, (see Fig. 3,) that engage the lower part of the handles C and support the said reservoir at the rear of the seed-receptacle D. The said fertilizer-reservoir $a$ has a delivery guide or spout, $b$, leading forward and downward to a point at the rear of the seed-conductor E and in advance of the operative part of the furrow-coverer G, which consists of a pair of blades (shown in plan view, Fig. 5) converging toward the rear end, so as to draw the loose earth in from the sides toward the center of the furrow, and by having the spout $b$ arranged as shown the fertilizer is delivered before the furrow is closed in, and is thus mixed with the earth that is closed in over the seeds, the fertilizer being mainly below the surface of the closed-in furrow. As shown in this instance, the bottom $a^{10}$ of the fertilizer-receptacle is curved and contains a movable gage-plate, $c$, (see Fig. 3,) shown as held by grooves $a^3$ at the bottom of the receptacle and provided with openings of different size, any desired one of which may be placed over the spout $b$, so as to regulate the quantity of the fertilizer delivered.

In order to insure the uniform delivery of the fertilizer in quantities determined by the size of the opening in the gage-plate $c$ that is placed over the spout $b$, the said receptacle contains an agitator, $d$, (shown as consisting of an arm connected with a rock-shaft, $e$,) having bearings in the side of the receptacle $a$, and being provided with an arm or lever, $f$, that extends forward and rests on the end of the seed-agitator arm F, as shown in plan view, Fig. 4, so that as the latter is moved up and down by the projections B' on the wheel B the said lever f is also moved up and down, oscillating the rock-shaft e and the agitator d in the fertilizer-receptacle.

The lower end of the agitator-arm d is forked or provided with a double foot, d', having a recess, d², and its movement is such that one portion, d', of the foot rests over the opening into the spout at each end of the stroke or oscillation of the agitator d, thus preventing the fertilizer from running out when the agitator is at the end of its strokes.

The inner walls, a², of the fertilizer-receptacle incline inward toward the bottom, as shown in Fig. 3, so that the fertilizer material naturally falls by gravity into the recess d² of the agitator-foot, and as the latter moves across the opening the material drops from the said recess into the spout b and is delivered in the furrow, and by this device the delivery of the fertilizer material at the lower end of the spout b is continuous and very uniform, each part of the furrow receiving the same amount of fertilizer as other parts, whether the movement of the seed-drill along the furrow is faster or slower.

The agitator-lever F of the seed-drill is provided with a stopping device, F', by which it may be supported above the actuating projections B' of the wheel, so as to prevent the delivery of seeds, when desired, in the movement of the machine, and by the construction and arrangement of the fertilizer-agitator and its actuating-arm f with relation to the said seed-agitator lever F the said fertilizer-agitator is also retained inoperative and with one portion, d', of its foot over the delivery-opening into the spout b whenever the seed-agitator lever is locked or rendered inoperative, so that the delivery of the fertilizer is stopped whenever the delivery of the seeds is stopped, thus preventing waste of the fertilizer material. The agitator-arm d is also provided with laterally-projecting fingers d³, that operate to loosen the fertilizing material in the receptacle a, so that it will slide down the inclined sides (shown in Fig. 3) toward the outlet-opening.

I claim—

1. A fertilizer attachment for a drill or seed-planting machine, consisting of a removable reservoir adapted to be supported on the framework of the machine, provided with a delivery-guide leading toward the seed-furrow, and an agitator and actuating mechanism therefor engaged with the seed-agitator of the planting-machine, as set forth, whereby the fertilizer is delivered uniformly and continuously while the drill is in operation, substantially as described.

2. A planting-machine comprising a frame provided with diverging handles, a wheel provided with cam projections, a seed-receptacle and agitator therein actuated by said cam-wheel, and a seed-conductor constituting a furrow opener or drill, and a furrow-closing device, combined with a fertilizer-receptacle having a delivery-spout terminating between the said seed-delivery drill and furrow-closer, and an agitating device provided with an actuating-arm operated by the cam projections on the cam-wheel, substantially as described.

3. A seed-drill comprising a frame and diverging handles, and a seed-distributing device, combined with a fertilizer-receptacle having inclined shoulders that seat upon the said diverging handles of the seed-drill, as set forth, and a delivery-passage and agitator co-operating therewith, substantially as described.

In testimony whereof I have signed my name to this specification in the presence of two subscribing witnesses.

RODERICK A. McLEOD.

Witnesses:
J. W. BRIGGS,
C. R. EVERSON.